US00RE37660E

(19) United States
(12) Reissued Patent
Talton

(10) Patent Number: US RE37,660 E
(45) Date of Reissued Patent: Apr. 16, 2002

(54) AUTOMATIC DIALING SYSTEM

(76) Inventor: David Talton, 9819 Courthouse Rd., Vienna, VA (US) 22181

(21) Appl. No.: 08/933,951

(22) Filed: Sep. 19, 1997

Related U.S. Patent Documents

Reissue of:
(64) Patent No.: 5,452,352
Issued: Sep. 19, 1995
Appl. No.: 07/928,163
Filed: Aug. 13, 1992

U.S. Applications:

(63) Continuation of application No. 07/496,038, filed on Mar. 20, 1990, now abandoned.

(51) Int. Cl.[7] ..... H04M 1/50
(52) U.S. Cl. ..... 379/355.05; 379/354; 379/355.08; 379/356.01; 379/357; 379/359
(58) Field of Search ..... 379/355, 354, 379/356, 357, 359, 216, 110; 235/380, 382

(56) References Cited

U.S. PATENT DOCUMENTS

| | | | | | |
|---|---|---|---|---|---|
| 4,126,768 | A | * | 11/1978 | Grenzow | 379/357 |
| 4,326,123 | A | * | 4/1982 | Hosterman | 235/380 |
| 4,447,676 | A | * | 5/1984 | Harris et al. | 379/199 |
| 4,473,720 | A | * | 9/1984 | Hegi | 379/355 |
| 4,737,984 | A | * | 4/1988 | Brown | 379/355 |
| 4,763,355 | A | * | 8/1988 | Cox | 3799/355 |
| 4,852,146 | A | * | 7/1989 | Hathcock et al. | 379/355 |
| 4,864,604 | A | * | 9/1989 | Aihara | 379/110.1 |
| 4,868,849 | A | * | 9/1989 | Tamaoki | 379/355 |
| 4,870,679 | A | * | 9/1989 | Hanna et al. | 379/355 |
| 4,882,750 | A | * | 11/1989 | Henderson et al. | 3799/355 |
| 4,941,172 | A | * | 7/1990 | Winebaum et al. | 379/355 |
| 4,944,000 | A | * | 7/1990 | Hishiki | 379/359 |
| 4,995,077 | A | * | 2/1991 | Malinowski | 379/355 |
| 5,343,519 | A | * | 8/1994 | Feldman | 379/355 |
| 5,377,263 | A | * | 12/1994 | Bazemore et al. | 379/356 |
| 5,452,352 | A | * | 9/1995 | Talton | 379/354 |
| 5,455,857 | A | * | 10/1995 | McGuire | 3799/355 |
| 5,539,819 | A | * | 7/1996 | Sonoyama et al. | 379/355 |

FOREIGN PATENT DOCUMENTS

| | | | | |
|---|---|---|---|---|
| JP | 0283260 | * | 11/1988 | 379/355 |
| JP | 0189263 | * | 7/1989 | 379/355 |
| JP | 0277044 | * | 11/1989 | 379/355 |

OTHER PUBLICATIONS

"The Sharper Image", p. 38, Jun. '87 Powerful auto–dialer has a brain for business.*

* cited by examiner

*Primary Examiner*—Wing F. Chan
(74) *Attorney, Agent, or Firm*—Kenyon & Kenyon

(57) ABSTRACT

The invention relates to a credit card dialing apparatus for use in automatically dialing account numbers, security codes and phone numbers into telephones. The apparatus includes a credit card size device having a memory, encoder, speaker, microphone and switch embedded into a circuit board for inputting and outputting specific information depending on the use of the card. The circuit described accesses the account by tones or signals fed through the receiver or direct data input from a small databus. In another embodiment, a microprocessor unit having a keyboard, microprocessor memory, encoder, a speaker unit and microphone as well as an alphanumeric display is utilized. This system permits the user to input the desired numbers and provide serial dialing and identification for particular sources.

26 Claims, 5 Drawing Sheets

AUTOMATIC DIALING SYSTEM

Matter enclosed in heavy brackets [ ] appears in the original patent but forms no part of this reissue specification; matter printed in italics indicates the additions made by reissue.

This application is a continuation of application Ser. No. 07/496,038, filed 20 Mar. 1990 now abandoned.

FIELD OF THE INVENTION

The invention relates to a credit card size microprocessor operated telephone dialer/credit card.

BACKGROUND AND DISCUSSION OF THE INVENTION

To place long distance telephone calls often the telephone dialer must either reverse the charges or recall a charge number for inputting into the telephone system. Particularly [four] *for* those who make a number of telephone calls, recalling these numbers can be a difficult process. Where a list of numbers is kept at a separate location the user, particular when travelling, must locate and retrieve the appropriate number, not always an easy to task.

In some airports and other high credit card use areas a few magnetic card reader type phones have been installed. Because so few of these phones exist, more than often a credit card caller must either wait in line for this special phone or he/she is forced to manually dial in the credit card number by way of the keypad on a standard phone set. The magnetic card reader phone is not practical for hotel rooms and many other general locations and therefore are never found in these desirable locations.

Although memory dialer systems have been developed, these have been deficient for a number of reasons. The existing units are bulky and require some knowledge of programming to be properly utilized. As a result of their large size and complications encountered in programming, few find it convenient to carry and utilize the existing remote dialers. In many cases the individuals would rather not go through the inconvenience of locating the magnetic credit card reader phones, waiting for these special phones, or the tedious task of manually dialing an access code and credit card number. Many current remote dialers will not consecutively dial the long series of access numbers required for the long distance service systems.

Often such systems do not accommodate the time delay properly incurred between the dialing of the telephone number and the tone for dialing in the charge number. Those systems which rely simply on a programmable delay do not adjust for a significant delay or pauses due to problems in the communication system or other defects. Under these circumstances the automatic dialer is inoperative, if the actual pause is greater than that programmed.

Other automatic dialers that exist in office telephones or other so-called portable systems are not small enough or sufficiently easy to use to make them as appealing as they should to the public. Both the size and operation of automatic telephone dialer systems of the past have created impediments to their widespread use.

The invention described therein includes the utilization of the present phone system, almost any phone, to automatically enter one's phone system credit card number. The user would no longer need to hunt for special magnetic card reading phones. Rather the user can enjoy the same ease of operation with the phone in his hotel room, client's office, or basically any phone. The credit card number will be entered to the phone system correctly each time, thus avoiding the tedious task of manually dialing the requisite code. One embodiment of the invention will not require any use programming. The user can receive his/her card completely pre-programmed.

Certain advantages of the invention include ease of dialing a telephone number using a charge card to input the number through the receiver of the telephone or through insertion into the charge card slot provided on certain telephones. The card has the ability to store a large number of numbers which can be retrieved as desired or dialed in sequence. This permits the user to recall numbers that he otherwise would not use because of the inability to locate the number. Where a sequence of numbers is to be dialed, the invention provides this feature as well.

Another advantage of the invention is the elimination of concurrent unauthorized use since the card can be designed without a visible number that can be readily copied. In this way the user can be ensured that while using the card no other third party can have access to his charge number. Because the number is not written elsewhere, there is no fear of losing the number so that it falls into the wrong hands and is used without permission. Should the "Universal Credit Card" be lost or stolen, the owner simply reports such and the access number would be made inactive by the appropriate company, or in the case that the user is using a PIN number, the card is inoperative. Essentially the card could be lost or stolen without the fear of fraudulent use. Industry-wide use would all but eliminate credit card fraud, currently in excess of 1.4 billion dollars.

One of the most important advantages of the invention is its size. The invention would resemble the size of an average credit card and fit in a credit card pouch of a wallet. The average person carries between three to twenty credit cards, and the invention is in this same format size. Due to the wide acceptance of the credit card the size of the invention would be readily accepted and have a place in everyone's wallet.

There are also advantages to the public phone system in that the invention will eliminate misdialings of the credit card numbers, reduce phone fraud, expedite access time, utilize more of the existing phone equipment, and eliminate the expenditure on magnetic card reading phones, ultimately reducing the cost to the consumer for phone service.

The system also reduces the delay often experienced in accessing the telephone. It eliminates wrong numbers, misdialings, wrong charge numbers and other such delays which often frustrate the use of public telephone systems.

This invention could also be used instead of the generic bank credit card or any credit card for that matter. Essentially the "Universal Credit Card" could be used for anything that the current credit cards are used for, while providing greater security to the credit card industry. The retainer or merchant can be assured that the person placing the order is authorized to use the charge card and not just ordering from a number that has been copied down, carbon copies with someone's number imprinted out or a lost or stolen card. The way the current system works, a person willing to commit credit card fraud could so for fifty-nine (59) days or more. Not until the owner recognized a dispute in his/her charges in a statement, would that person know someone was making illegal charges to their account. The merchant, the consumer, the industry, and general public all bear this unnecessary added expense. Should the invention become the industry standard it would all but eliminate credit card fraud.

The "Universal Credit Card" will greatly simplify the credit card industry through both consolidation of the multiple cards and eliminating credit card fraud. A bank card company (i.e. Visa, Master Card), gas company, phone company, etc. will simply notify the individual his/her credit has been approved along the "Ultimate Credit Card". The owner then enters the information into the card via the keypad or the data bus. To use the card to charge, the owner must first input his personal identification number (PIN number).

One apparatus for achieving these goals is a credit card size unit having a memory, encoder, speaker, microphone and switch. In utilizing the invention as a phone card, depending on which carrier, the card is used to access an account or gain access to a phone system. The invention accesses the account via tones or signals fed through the receiver (microphone) or direct data input via a small data bus on the card. The data bus can also be used for inputting and outputting information to and from the device, and if applicable, in conjunction with the infrared source and detector.

A second apparatus for achieving these goals includes a credit card size microprocessor unit having a keypad, a microprocessor memory, an encoder, a speaking unit, a microphone as well as an alphanumeric display. The keypad permits the user to input the desired numbers, and to provide serial dialing to input new numbers and to identify the numbers as belonging to particular sources. Unlike other systems the processor is connected to a microphone and an output speaker such that the account number is not input to the telephone until the appropriate dial tone signal has been sensed by the microphone. This avoids the inefficiencies of programming a time delay as utilized in other systems. Each number that is being dialed is displayed so that the user can be sure that the correct number is being dialed in the telephone. The invention can also have a connection to an external system for inputting and outputting data to and from another source if that is desired. Typically the external bus is used for conventional credit card use (i.e. bank card), and if applicable in conjunction with a infrared source and detector.

in the two aforementioned apparatus, the microphone, speaker, and encoder may or may not be part of the design depending on the intended use of the device (i.e. the phone dialing circuitry could be eliminated in the event the manufacturer does not desire to utilize phone related capabilities).

The above has been a brief description of deficiencies in the prior art and features of the invention. Other features of the invention will become apparent to those skilled in the art from the Detailed Discussion of the Preferred Embodiment which follows.

BRIEF DESCRIPTION OF THE INVENTION

DETAILED DISCUSSION OF THE PREFERRED EMBODIMENT

Figure 1:
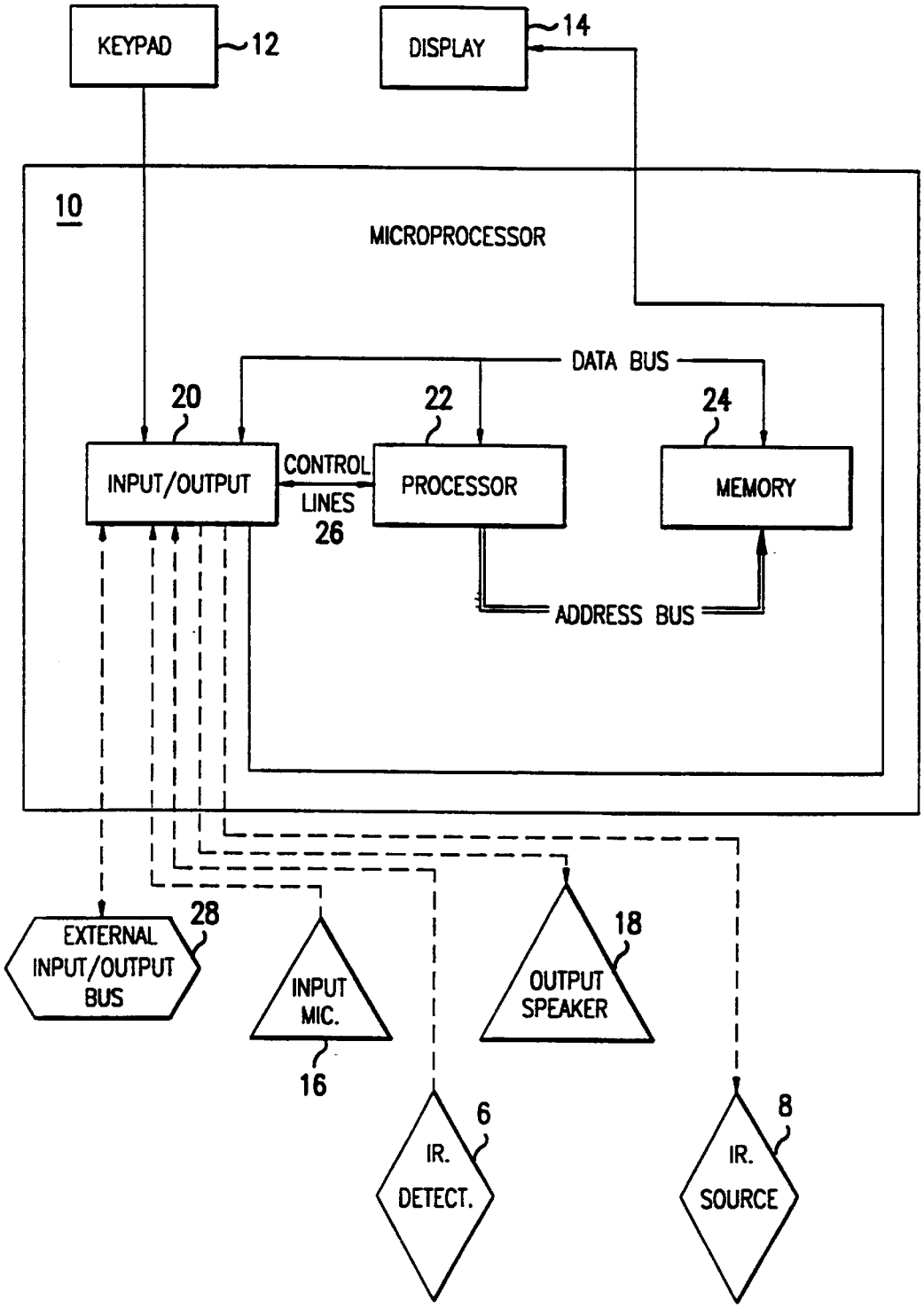
FIG. 1 is a schematic of the dialer/credit card of the invention.

As can be seen in FIG. 1, the apparatus includes a keypad for inputting certain information into input/output module 20. The processor 22 is connected to the input/output *module 20* through control lines 26 and also is connected to memory 24 through address and data busses. A data bus also connects input/output module to processor 22 and memory 24. The input/output module 20 is connected to input microphone 16 and separately to output speaker 18. In this way after the desired numbers have been input into the system corresponding to a number to be used, the user can access the number by pressing the appropriate key on the keyboard. To use as a phone credit card the card is placed against the receiver and the number, through use of tones corresponding to touch tone frequencies, will be dialed into the receiver. Only the number being dialed will be immediately input into the receiver. Once the credit card request tone is sensed by the microphone, the user charge number will then be input into the receiver again corresponding to touch tone frequencies to complete the call.

The card can also be used via the data bus as a phone card or regular credit card (i.e. bank credit card, etc.) in a similar manner. The card would be inserted into a phone or an input unit of a cash register/computer allowing the charge if the appropriate PIN number has been entered.

Figure 2:
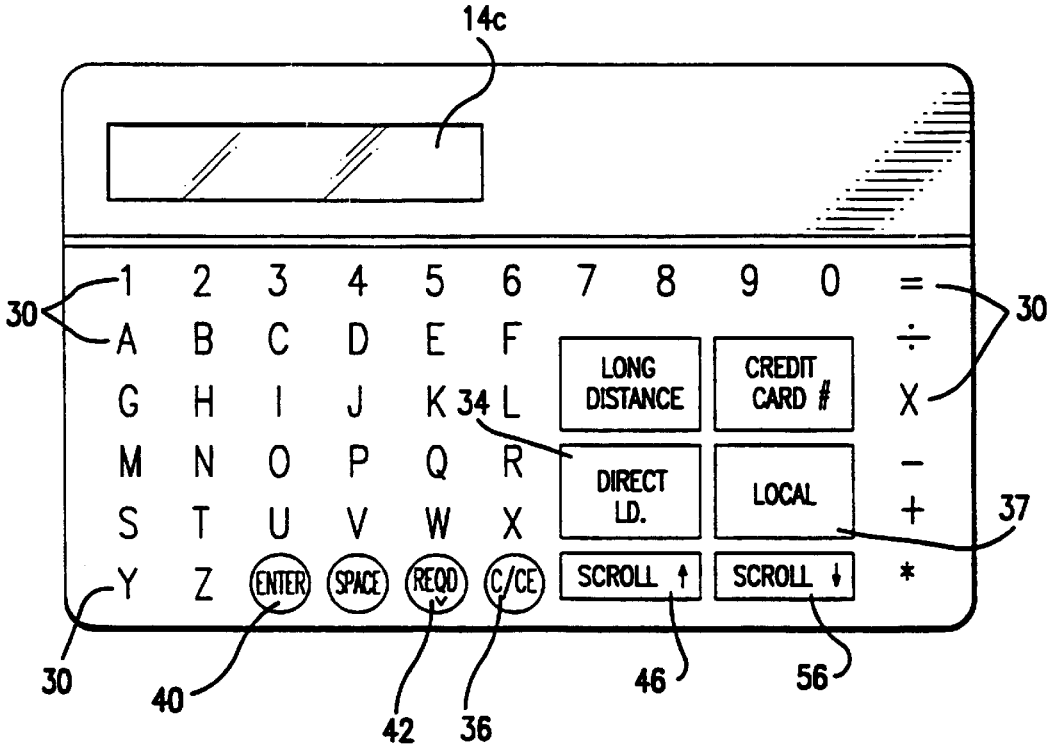
FIG. 2 shows one side of the dialer/credit card with the keypad and display.
Figure 3:
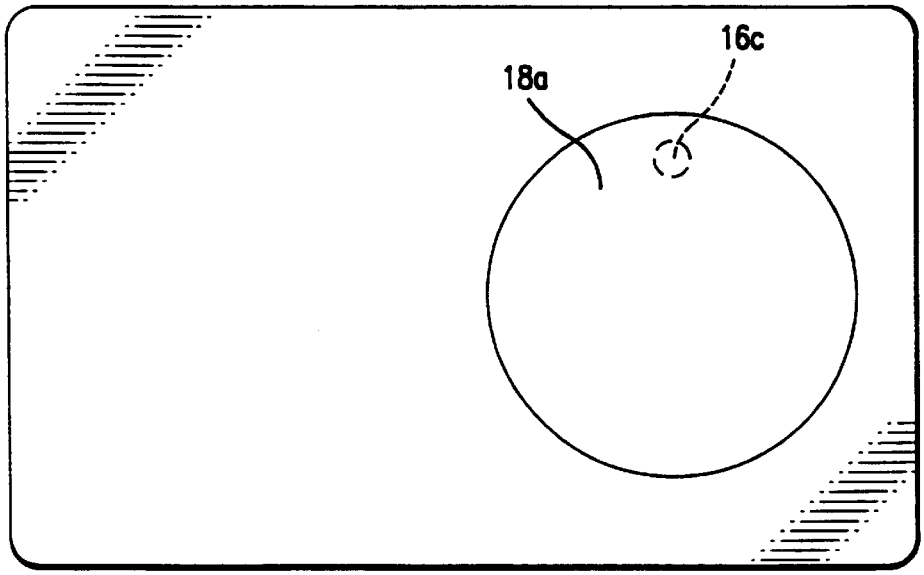
FIG. 3 is the reverse side of the credit card as shown in FIG. 2, the side with the speaker and microphone.

With reference to FIG. 2, the front of the card, there is shown a display and a keypad with function keys and decimal numbers 30. In this manner the speaker and microphone can be placed against the mouthpiece of the telephone, once the appropriate number has been selected. In another embodiment the card can have the speaker 18a and microphone 16c located on the same side of the card with the keypad and display.

There is also provided a sequence key 42, which enables the user to shift from one number to the next in sequencing the calls. The telephone number and identification number are shown on display 14C. For direct dial long distance calling there is a special key 34 for this purpose. Clear key 36 is provided to clear a number from the register for inputting a new number. Scroll keys 46 and 56 are provided and operate with the microprocessor to scroll through the numbers until the desired number is obtained. By pressing the scroll keys 46 and 56 the name, address and corresponding data will be displayed simultaneously or sequentially by the display means on the face of the card. A sequence key 42 is provided to dial several numbers in sequence. Starting with a particular number and inputting according to the sequence key, numbers will continue to be dialed until a particular connection is made. A local dialing key 37 is provided to eliminate the area code for local dialing. Finally, an enter key 40 is provided for inputting new data.

Once the data has been properly input into the system, it can be used in the following manner. The user presses the sequence key until the desired data is displayed on display 14C. This is the data that will be input to the system once operated properly. In utilizing the device as a phone card, the card's speaker is placed over the mouthpiece of the receiver and the user then presses the direct long distance dial key, if it is a long distance number. After a programmed delay period the number will be dialed using the tones according to a touch tone system. Once the number is completed the system will stop until the appropriate tone which identifies the need for the account number is sensed by microphone 16c. Once the tone is sensed, the speaker 18a will then be actuated to input the account number using the touch tone system.

Where a number of numbers are to be dialed until a connection is made, the sequence key 42 can be operated. In this system the sequence key is initially pressed and the card will automatically seek the next set of data. If no data is stored in a particular block, the sequence addressing step will move to the next block of data until a number is located. At this point the operation of the program will stop until a direct call is dialed or the sequence key is again pressed. Dialing would be accomplished again as discussed above. Similarly, rather than automatically sequencing, the user can scroll to the desired number by pressing the scroll key 46 and 56.

To change a number or an identification the processor is operated to arrive at a particular data location. This data is cleared by actuating clear key 36 and a new identification number and telephone number is input using the decimal keys 30. Once the desired number has been input the enter key is hit to place it in memory.

With scroll keys 46 and 56 the user can input the identification numbers, actuating the scroll keys until the data corresponding to the identification number is found.

Figure 4:
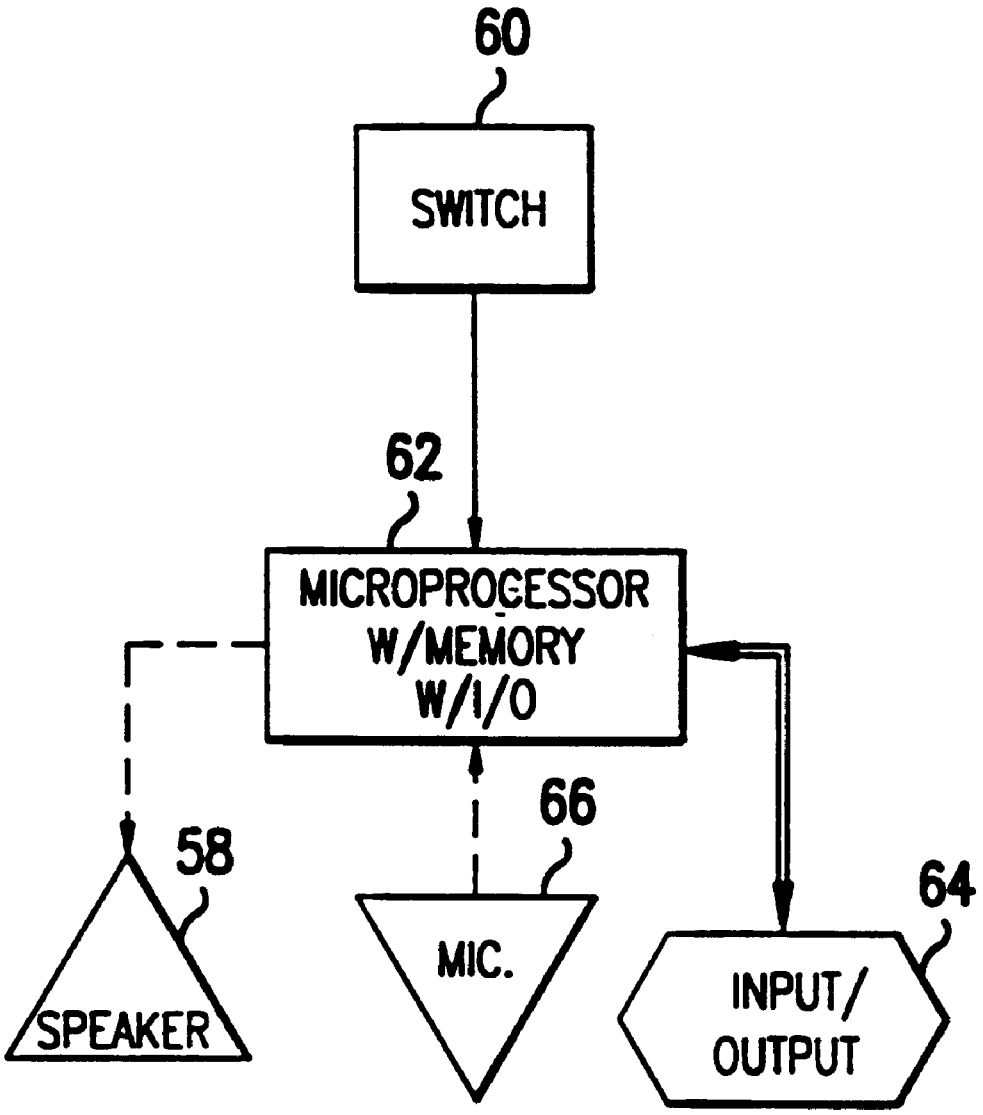
FIG. 4 is a schematic of the "Universal Credit Card", the invention.

As can be seen by FIG. 4, another embodiment of the apparatus includes switch 60 that activates the microprocessor with memory 62 that in turn outputs to speaker 58. The microprocessor 62 is connected to an input/output bus 64. In utilizing this device as a phone card, after the card has been preprogrammed, the user can place the speaker 58 over the receiver and press switch 60 activating the microprocessor outputting to the speaker 58. The speaker emits the touch tone frequencies corresponding to the user's account number thus allowing access to the phone system or completing the dialing procedure. The input/output bus 64 could be used for programming the card or outputting information directly to a phone system, cash register, or computer.

Figure 5:
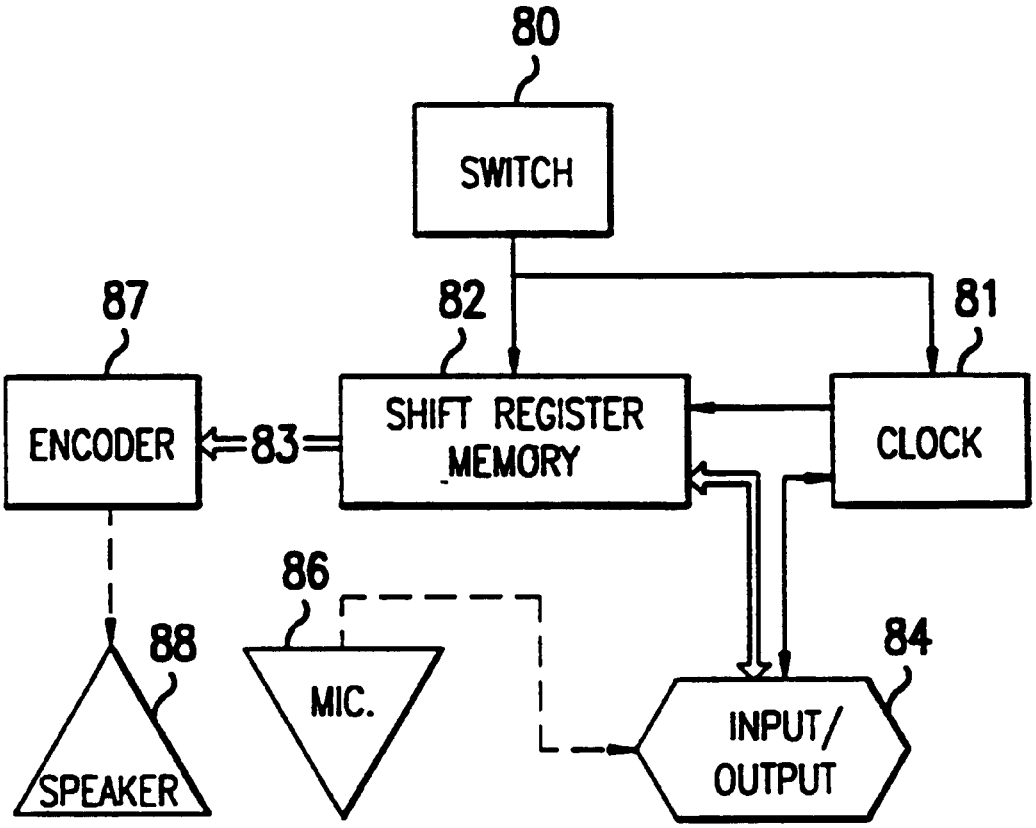
FIG. 5 is a second schematic of the "Universal Credit Card".

As seen in FIG. 5, the apparatus consists of a switch 80 connected to a clock 81 and a shift register 82 that outputs via databus 83 to the encoder 87 that in turn outputs to speaker 88. In this way after the card has been preprogrammed the user can place the speaker 88 over the receiver and press switch 80 activating the clock and shift register outputting to the encoder 87 in turn outputting to the speaker 88, or place the card on the receiver and when the credit card request tone is sensed by the microphone 86 the input/output circuitry 84 activating the clock 81 and shift register 82 outputting to the encoder 87 in turn outputting to the speaker 88. The speaker emits touch tone frequencies corresponding to the user's account number thus allowing access to the phone system or completing the dialing procedure. The input/output bus 84 could be used for programming the card or outputting information directly to the phone system, cash register, or computer.

Figure 7:
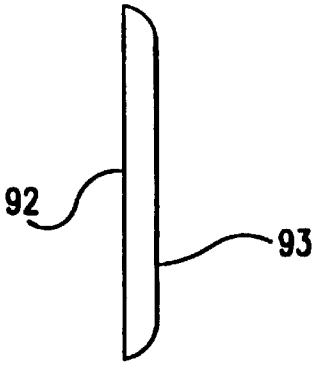
FIG. 7 shows an edge view of the "Universal Credit Card."
Figure 6:
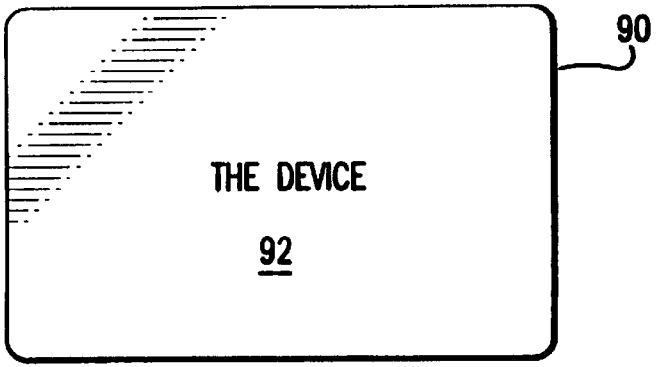
FIG. 6 shows one side of the "Universal Credit Card".
Figure 8:
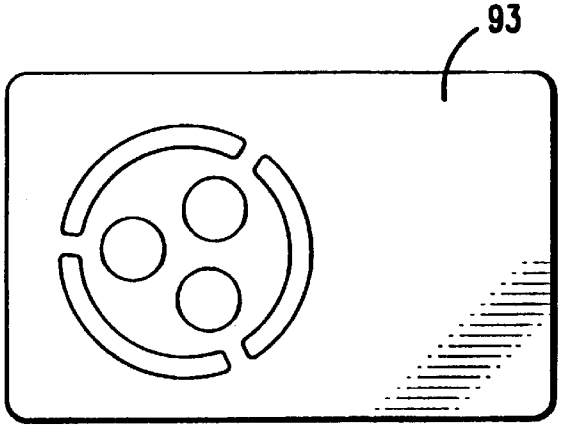
FIG. 8 shows the reverse side of the "Universal Credit Card".

The actual size of the device to house the elements discussed above is shown in FIGS. 6, 7 and 8. The card 90 as shown has a typical credit card configuration with the logo and other information on front 92. The near side 93 includes the microphone and speaker that can be made small enough not to significantly interfere with the thickness as shown. These elements can be embedded in the card and the circuit board to reduce the amount of space required.

The above has been a detailed discussion of the preferred embodiment of the invention. The full scope of invention to which Applicant is entitled is defined in the claims which follow and their equivalents. The specification should not be interpreted to unduly narrow the scope of invention to which Applicant is otherwise entitled.

What is claimed is:

1. An electronic credit card and direct dialing device comprising:

a case of a size and shape to fit in the user's wallet corresponding to the size of a credit card and to be held in hand during use or inserted into a corresponding input device;

a keyboard on said device comprising alphanumeric keys for numerals 0 to 9 and letters A to Z and function keys;

alphanumeric display means in said case with a capacity for displaying a plurality of telephone numbers, credit card numbers and other data;

read-write memory circuit means in said case for storing and retrieving data items comprising selected ones of said credit card numbers, said telephone numbers, and identification, said memory circuit having a capacity for storing a plurality of data items under a multiplicity of identification names as memory addresses;

said storing means controlled by said alphanumeric keys and functions keys for feeding to said memory circuit means said data items including said selected ones of said telephone numbers, said credit card numbers, and said identification to be stored and for identifying the names under which said items are to be stored;

retrieving means controlled by said alphanumeric keys and said functions keys for retrieving said data items stored by said memory circuit means including means for designating the name under which the desired data items are stored and for displaying by display means said name and said data items stored under the designated name; and means for imparting a first audio signal identified by a telephone for dialing one of said telephone numbers;

means for sensing a dial tone and request tones from said telephone, said means for sensing capable of sensing said dial tone and request tones from an earpiece of said telephone when said device is located at a mouthpiece of said telephone; and means for automatically actuating said means for imparting a second audio signal corresponding to a charge number upon sensing said dial tone from said telephone, said second audio signal being imparted to said telephone to complete a call.

2. The device according to claim 1 wherein said retrieving means comprises retrieving a name by inputting a mnemonic address of said name by said keyboard and means for sequencing from one name to another when two or more names having the same mnemonic address have been stored.

3. The device according to claim 1 wherein said storing means comprises means for replacing data stored under a name by another data item.

4. The device according to claim 1 wherein said storing means includes means for storing additional data under said names under which previous data has been stored.

5. The device according to claim 1 wherein said retrieving means includes protective means requiring inputting of a secret code in order to retrieve said data.

6. The device according to claim 1 further comprising means for storing data items at a memory address and for retrieving said data items by inputting said address.

7. The device according to claim 1 further comprising a calculating circuit means in said device for performing mathematical calculations under the control of said keyboard and for displaying the results of said calculations by said display means, and switch means for shifting between calculating mode of operation and teleaddress mode of operation.

8. The device according to claim 1 wherein said retrieving means includes means for converting retrieved data representing one of said telephone numbers into a sequence of dialing tones receivable to a telephone system to actuate switching gear to make a connection with the telephone of a person whose name has been inputted by said keyboard.

9. The device according to claim 8 wherein said converting means comprises touch tone signal generating means receiving said retrieved data, a wave shaper receiving output of said generating means, an audio amplifier for amplifying an output of said wave shaper, and a speaker driven by said amplifier.

10. The device according to claim 1 further compressing input/output bus for programming said device.

11. The device according to claim 10 further comprising an input/output bus for outputting information directly into a phone system or a credit card system.

12. An electronic credit card and direct dialing device comprising:

a case of a size to fit in the user's wallet corresponding to the size of a credit card and to be held in hand during use or inserted into a corresponding input device;

read-write memory circuit in said case for storing and outputting data corresponding to credit card preselected information;

means for feeding data to the memory corresponding to a plurality of account numbers or access numbers to be stored;

means for sensing a dial tone and request tones from a telephone, said means for sensing capable of sensing said dial tone and request tones from an earpiece of said telephone when said device is located at a mouthpiece of said telephone;

a speaker;

means for imparting an audio signal from said speaker identified by a phone system for dialing a telephone number, inputting data, and entering selected ones of said account or access numbers;

means for automatically actuating an audio signal corresponding to a charge number upon sensing said dial tone from said telephone, said audio signal being imparted to said telephone to complete a call;

a data bus; and retrieving means for retrieving said data stored by said memory to be output to said speaker or data bus.

13. The device according to claim 12 wherein said retrieving means includes means for converting said retrieved data into a sequence of dialing tones receivable by a telephone system for at least one of the following: to complete said call, to access a desired telephone system, and to make use of a credit card account.

14. The device according to claim 13 wherein said converting means comprises touch tone signal generating means receiving said retrieved data, a wave shaper receiving an output of said generating means, an audio amplifier for amplifying an output of said wave shaper, and said speaker being driven by said amplifier.

15. The device according to claim 12 further comprising input/output bus for programming said device.

16. The device according to claim 15 further comprising an input/output bus for outputting information directly into a phone system or a credit card system.

17. An electronic credit card sized direct dialing device comprising:

a case of a size to fit in a user's wallet corresponding to the size of a credit card and to be held in hand during use or inserted into a corresponding input device;

a shift register memory for storing data;

a clock connected to said shift register for imparting a clock signal thereto;

a switch connected to said shift register and to said clock for actuating said clock and said shift register to shift data out of said shift register;

means for sensing a dial tone and request tones from a telephone, said means for sensing capable of sensing said dial tone and request tones from an earpiece of said telephone when said device is located at a mouthpiece of said telephone;

means for actuating an audio signal corresponding to a charge number upon sensing said dial tone from said telephone, said audio signal being imparted to said telephone to complete a call; and an encoder in operative connection with said shift register for converting a signal from said shift register to signals to operate a speaker for emitting touch tone frequencies corresponding to a user's account number.

18. The device according to claim 17 further comprising input/output bus for programming said device.

19. The device according to claim 18 further comprising an input/output bus for outputting information directly into a phone system or a credit card system.

20. The device according to claim 17 further comprising a printed circuit board wherein said shift register, said clock, said means for sensing the dial tone, said means for actuating an audio signal and said encoder are embedded on the printed circuit board to minimize size.

*21. A credit card sized communications device comprising:*

*a credit card sized housing insertable into a computer and couplable to a telephone network, said credit card sized housing including:*

*a) a processor;*

*b) a plurality of control lines being coupled to the processor;*

*c) a data bus coupled to the processor;*

*d) an address bus coupled to the processor;*

*e) a memory coupled to the processor via the data bus and the address bus, wherein the processor retrieves data over the data bus from the memory by specifying an address over the address bus, and stores data in the memory by transmitting the data over the data bus to the memory and by specifying the address over the address bus;*

*f) an input/output port couplable to the computer and to the telephone network, said input/output port being coupled to the processor via the data bus and a plurality of control lines, transmitting data to and from the processor via the data bus, and receiving data from and transmitting data to the computer and telephone network, said input/output port controlled by the processor via the plurality of control lines, wherein said processor outputs a plurality of access signals to the input/output port upon detecting an available access signal from the telephone network and then waits until receiving an additional signal from the telephone network via the input/output port before sending additional data signals to the telephone network via the input/output port.*

*22. The device according to claim 21, wherein the input/output port further comprises a microphone and a speaker that transmit audible signals to and from a telephone handset to access the telephone network.*

*23. The device according to claim 21, wherein the processor receives access data from the computer and at least temporarily stores the access data in the memory.*

*24. The device according to claim 21, wherein the processor is programmable from an external source with access data.*

*25. The device according to claim 21, wherein the additional data signals include account information and the additional signal includes a request signal.*

*26. The device according to claim 21, wherein said credit card sized communications device is a direct dialing device.*

* * * * *